United States Patent [19]

Ito et al.

[11] Patent Number: 4,623,587
[45] Date of Patent: Nov. 18, 1986

[54] MULTI-LAYER FILM OR SHEET MATERIAL

[75] Inventors: Masakazu Ito; Shinji Kawamura, both of Sodegaura, Japan

[73] Assignee: Idemitsu Petrochemical Co., Ltd., Tokyo, Japan

[21] Appl. No.: 658,497

[22] Filed: Oct. 9, 1984

[30] Foreign Application Priority Data

Oct. 18, 1983 [JP] Japan .............................. 58-193430
Oct. 18, 1983 [JP] Japan .............................. 58-193431

[51] Int. Cl.$^4$ ............................................. B32B 27/00
[52] U.S. Cl. .................................. 428/335; 428/349; 428/516
[58] Field of Search ..................... 428/516, 349, 335

[56] References Cited

U.S. PATENT DOCUMENTS 4,363,841 12/1982 Snow ..................................... 428/35
4,456,660 6/1984 Colombo .............................. 428/516
4,505,969 3/1985 Weiner ................................. 428/516

FOREIGN PATENT DOCUMENTS 095299 11/1983 European Pat. Off. .
1188280 3/1965 Fed. Rep. of Germany ...... 526/350
2115348 9/1983 United Kingdom .

Primary Examiner—Edith Buffalow
Attorney, Agent, or Firm—Frishauf, Holtz, Goodman & Woodward

[57] ABSTRACT

The invention provides a multi-layer film or sheet material of thermoplastic resins having a high adhesive bonding strength between layers as well as excellent heat-sealability. The multi-layer film or sheet material comprises a layer A formed of a resin composition composed of a polypropylene-based resin and a linear low-density ethylene α-olefin copolymer having specified density and a layer B formed of a polypropylene-based resin or a layer formed of a resin composition of a polypropylene-based resin and a low-crystallinity α-olefin copolymer. The invention also provides a laminated film or sheet material comprising a base material, e.g. plastic film, paper, aluminum foil, etc., and the above defined multi-layer film or sheet material bonded together through an intermediate layer of an adhesive in such a manner that the layer A in the multi-layer film or sheet material faces the base material.

21 Claims, 3 Drawing Figures

MULTI-LAYER FILM OR SHEET MATERIAL

BACKGROUND OF THE INVENTION

The present invention relates to a multi-layer film or sheet material or, more particularly, to a multi-layer film or sheet material of high adhesive bonding strength between layers having excellent susceptibility to adhesive bonding and heat-sealability as well as excellent impact strength at low temperatures and rigidity and a laminated film or sheet material with the multi-layer film or sheet material as the sealing layer.

As is well known, films of polypropylene-based resins are widely used in a variety of applications by virtue of the excellent heat resistance, mechanical properties, workability and the like properties thereof. The fields of application of polypropylene-based films are, however, under certain limitations due to the insufficiently high heat-sealability and adhesive bondability thereof. Accordingly, proposals have been made to blend the polypropylene-based resin with a polyethylene, polyethylene-based copolymer, thermoplastic elastomer and the like although the miscibility or compatibility of these additive polymers with polypropylene is not always sufficiently high so that several problems are unavoidable that the resultant blended resin has decreased transparency and the excellent properties such as heat resistance, rigidity and the like inherently possessed by the polypropylene-based resins are sometimes lost.

Therefore, another proposal has been made of a coextruded composite film material composed of a polypropylene-based resin and a linear low-density ethylene α-olefin copolymer. Although the heat-sealability can be improved to some extent in the composite films of this type, such a composite film is defective not only in the insufficient adhesive bonding strength between layers but also in the poor adhesive bondability in lamination with a base film of different kind.

On the other hand, stretched films of polypropylene, polyamide, polyester and the like resins and aluminum foils are widely used as a base film for wrapping of, for example, various kinds of foods by virtue of the excellent heat resistance, moisture- and gas-impermeability and other properties but these materials are poor in the heat-sealability so that they are usually used as a component of a multi-layer film or sheet material with other heat-sealable films.

To describe the method for the preparation of such a multi-layer film or sheet material, the above mentioned base film and a heat-sealable film are bonded together to form a laminate by the so-called dry lamination using a polyurethane-type adhesive and the like or by the extrusion lamination using a low-density polyethylene film as the adhesive layer. When a polyethylene-based film is used as the heat-sealable film in this case, however, the excellent property of high heat resistance possessed by the base film may eventually be lost.

Accordingly, the most widely used heat-sealable film is an nonstretched film of polypropylene in the fields where high heat resistance, mechanical strength and rigidity are essential. Nonstretched polypropylene films used as the heat-sealable film, however, are poor in the adhesive bondability so that the adhesive bonding with the molten resin of low-density polyethylene and the like or a polyurethane-based adhesive as the adhesive layer must be preceded by anchoring treatment of the surface of the nonstretched polypropylene film as the heat-sealable film in order to improve the adhesion with the adhesive layer. A problem in the anchoring treatment, however, is that, because the treatment is performed by use of an organic solvent, the solvent more or less remains unavoidably in the laminated film after bonding with the base film to cause disadvantages in respect of safety and unpleasant odor in the foods wrapped with the film due to the migration of the solvent thereto. Moreover, increase in the production costs is unavoidable in the anchoring treatment including the investment for the treatment facilities, cost of energy consumed in the step of drying and cost for the materials used in the treatment and the anchoring treatment is also undesirable in respect of the workers' health and safety as well as in environmental pollution so that improvement has been eagerly desired.

Indeed, no heat-sealable film is available which in itself is excellent in the heat resistance, rigidity and other properties and can satisfy simultaneously the adhesive bondability to a base film or a low-density polyethylene for extrusion lamination and the heat-sealability in bag making as well as the strength of heat-sealing.

SUMMARY OF THE INVENTION

An object of the present invention is therefore to provide a novel multi-layer film or sheet material free from the above described problems and disadvantages in the prior art materials in various respects.

The extensive investigations undertaken by the inventors with the above object have led to a discovery that the difficult requirements are satisfied by a multi-layer film or sheet material comprising a layer formed of a resin composition composed of a polypropylene-based resin and a linear low-density ethylene α-olefin copolymer and a layer formed of a polypropylene-based resin or a layer formed of a resin composition of a polypropylene-based resin and a low-crystallinity α-olefin copolymer and the present invention has been completed on this discovery.

Thus, in one embodiment of the invention, the multi-layer film or sheet material provided by the invention comprises: (A) a layer formed of a resin composition composed of a polypropylene-based resin and a linear low-density ethylene α-olefin copolymer having a density in the range from 0.900 to 0.950 g/cm$^3$, which is referred to as the layer A hereinbelow; and (B) a layer formed of a polypropylene-based resin or a layer formed of a resin composition of a polypropylene-based resin and a low-crystallinity α-olefin copolymer, which is referred to as the layer B hereinbelow, bonded together one on the other.

In another embodiment of the invention a laminated film or sheet material comprising:
  (1) a base material; and
  (2) a multi-layer film or sheet material formed of the layer A and the layer B as described in the first embodiment of the invention given above;
adhesively bonded together one on the other with the layer A facing the base material through
  (3) a layer of an adhesive intervening therebetween, which is referred to as the layer 3 hereinbelow.

DETAILED DESCRIPTION OF THE PREFERRED EMBODIMENTS

Figure 1:
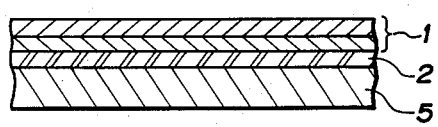
FIGS. 1 and 2 are each a schematic cross sectional view of the laminated film or sheet material according to the invention.

In the first place, detailed descriptions are given of the multi-layer film or sheet material according to the first embodiment of the invention.

The layer A, which is one of the component layers of the inventive multi-layer film or sheet material, is formed of a binary resin composition including a polypropylene-based resin. The type or grade of the polypropylene resin is not particularly limitative but suitable ones usually have a density in the range from 0.895 to 0.915 g/cm$^3$ and a melt index (MI) in the range from 0.5 to 30 g/10 minutes or, preferably, from 1.0 to 20 g/10 minutes. The polypropylene-based resin used as one of the components in the layer A may be a homopolymeric polypropylene or a random or block copolymer of propylene with other α-olefins such as ethylene, butene-1, hexene-1, 4-methylpentene-1 and the like of which the content of the comonomer should preferably be 20% by weight or smaller. Particularly preferable are the random copolymers of propylene with other α-olefins of which the content of the latter is in the range from 0.5 to 20% by weight. These polypropylene-based resins can be used either singly or as a combination of two kinds or more according to need. In some cases, advantages are obtained by admixing the above exemplified polypropylene-based resin with a polypropylene modified with an unsaturated carboxylic acid or a derivative thereof.

The other component in the resin composition for the layer A is a linear ethylene α-olefin copolymer which is a linear low-density ethylene α-olefin copolymer prepared the medium- or low-pressure process. Suitable copolymers have a density in the range from 0.900 to 0.950 g/cm$^3$ or, preferably, from 0.900 to 0.930 g/cm$^3$ and a melt index in the range from 0.5 to 30 g/10 minutes or, preferably, from 1 to 20 g/10 minutes. The α-olefins copolymerized with ethylene are not particularly limitative including those having from 3 to 12 carbon atoms per molecule exemplified by propylene, butene-1, pentene-1, hexene-1, octene-1, 4-methylpentene-1, decene-1, dodecene-1 and the like. The content of these copolymerized α-olefins in the copolymer is usually in the range from 2 to 20% by weight. It is of course that these ethylene α-olefin copolymers can be used either singly or as a combination of two kinds or more of the copolymers differing in the density and/or melt index or differing in the kind and/or content of the copolymerized α-olefin.

In respect of the proportion of the two kinds of the component resins in the resin composition for the layer A, i.e. the weight ratio of the polypropylene-based resin and the linear low-density ethylene α-olefin copolymer having a density of 0.900 to 0.950 g/cm$^3$, the resin composition should be composed of from 5 to 80 parts by weight of the former and from 95 to 20 parts by weight of the latter or, preferably, from 10 to 60 parts by weight of the former and from 90 to 40 parts by weight of the latter. It should be noted here that the use of the latter copolymer alone or a resin composition composed of a polypropylene-based resin and a low-density polyethylene by the high-pressure process as the material of the layer A is absolutely undesirable because no improvements can be obtained in the adhesive bondability and heat-sealability as the object of the invention in such a case and peeling may sometimes take place between the layers of the multi-layer film or sheet material. Furthermore, the resin composition composed of a polypropylene-based resin and a high-pressure process polyethylene is practically undesirable with poor transparency of the film shaped thereof due to the low miscibility or compatibility of the resins.

In the next place, the layer B as the other component layer of the inventive multi-layer film or sheet material is formed of a polypropylene-based resin alone or a resin composition composed of a polypropylene-based resin and a low-crystallinity α-olefin copolymer. The polypropylene-based resin used here is selected from the same class of the resin as the polypropylene-based resin used in the layer A. The polypropylene-based resin can be either the same as or different from that used in the layer A.

The layer B may be formed of a single polypropylene-based resin alone but use of a resin composition composed of a polypropylene-based resin and a low-crystallinity α-olefin copolymer is more preferable when a multi-layer film or sheet material having further improved heat-sealability is desired.

The low-crystallinity α-olefin copolymer used in combination with the polypropylene-based resin should have a density in the range from 0.850 to 0.900 g/cm$^3$ or, preferably, from 0.860 to 0.890 g/cm$^3$, a melt index in the range from 0.01 to 50 g/10 minutes or, preferably, from 0.05 to 20 g/10 minutes and a degree of crystallinity in the range up to 30% or, preferably, up to 25%. When these values of the parameters are not satisfied by the copolymeric resin, the resultant multi-layer film or sheet material is less acceptable in respects of the heat-sealability, moldability, rigidity and other properties.

The low-crystallinity α-olefin copolymer here implied is a copolymer mainly composed of ethylene or propylene as the monomeric component copolymerized with other α-olefins. The α-olefins to be copolymerized with ethylene or propylene are not particularly limitative including ethylene, propylene, butene-1, pentene-1, hexene-1, octene-1, 4-methylpentene-1, decene-1, dodecene-1 and the like. Beside ethylene or propylene and the above mentioned α-olefins, the copolymer may comprise other types of monomeric constituents introduced by the copolymerization with monomers copolymerizable therewith such as non-conjugated dienic monomers, e.g. 1,4-hexadiene, dicyclopentadiene, 5-methyl-2-norbornane and the like, and conjugated dienic monomers, e.g. butadiene, isoprene and the like. Particularly preferable in the present invention are the copolymers composed of ethylene or propylene and other α-olefins and copolymers thereof with copolymerizable dienic monomers of which the content of the α-olefins including ethylene and propylene is at least 80% by moles and the content of the α-olefins other than ethylene and propylene is in the range from 4 to 50% by moles or, preferably, from 5 to 40% by moles.

Exemplary of the suitable low-crystallinity copolymer of α-olefins are ethylene propylene copolymer, propylene ethylene copolymer, ethylene butene-1 copolymer, ethylene propylene 1,4-hexadiene copolymer, ethylene propylene 5-ethylidene-2-norbornane copolymer and the like. It is of course that these low-crystallinity α-olefin copolymers can be used either singly or as a combination of two kinds or more of those having different values of the density, melt index and degree of crystallinity or those prepared with different kinds of α-olefins.

When the layer B of the inventive multi-layer film or sheet material is formed of a resin composition of a polypropylene-based resin and a low-crystallinity α-olefin copolymer, the resin composition should be composed of from 50 to 99 parts by weight of the former and from 50 to 1 part by weight of the latter or, preferably, from 70 to 95 parts by weight of the former and from 30 to 5 parts by weight of the latter.

The multi-layer film or sheet material of the invention is usually prepared by the method of co-extrusion molding or extrusion lamination though not particularly limited thereto. The method of co-extrusion molding is preferred and the T-die co-extrusion molding using a flat die and the inflation method using a circular die are satisfactory.

The layer B in the inventive multi-layer film or sheet material may be a unitary layer or a duplex layer in itself provided that the layer is formed of a polypropylene-based resin or a resin composition of a polypropylene-based resin and a low-crystallinity α-olefin copolymer. The polypropylene-based resin used in this case includes homopolymers and random or block copolymers of propylene. When the layer B is a duplex layer formed of two unit layers, a preferable structure of the duplex layer is that the unit layer at the inside, i.e. the side facing the layer A, is formed of a homopolymeric polypropylene resin and the unit layer at the outside is formed of a random or block copolymer of propylene or a resin composition comprising the above mentioned low-crystallinity α-olefin copolymer. The thickness ratio of the inside layer, i.e. the interlayer of the layer B, to the outside layer is usually in the range from 1:1 to 20:1 or, preferably, from 2:1 to 10:1 in order to further increase the rigidity and mechanical strength retaining the heat-sealability.

The multi-layered film or sheet material of the invention is basically a binary- or plural-layered material comprising the above described layers A and B. It is optional, however, according to need to provide an intermediate layer formed of a different thermoplastic resin therebetween. As the thermoplastic resin used in this case are named low-density polyethylenes by the high pressure process, linear low-density ethylene α-olefin copolymer by the medium or low pressure process, high-density polyethylenes, poly(butene-1), poly(4-methylpentene-1), ethylene vinyl acetate copolymer and the like resins other than the polypropylene-based resins, polyvinyl chloride resins, polyvinylidene chloride resins, saponified ethylene vinyl acetate copolymer, polyester resins, polyamide resins, polycarbonate resins and others.

The thickness of the inventive multi-layer film or sheet material is not particularly limitative ranging from very thin film-like ones to sheet-like ones having a thickness of 2 mm or larger. The thickness of each of the layers A and B is also not particularly limitative although it is preferable that, assuming that the multi-layer film or sheet material is film-like, the thickness of the layer A is in the range from 1 to 30 μm or, more preferably, from 1 to 20 μm and the thickness of the layer B is in the range from 1 to 100 μm or, more preferably, from 1 to 50 μm. When an intermediate layer is provided between the layers A and B so that the inventive multi-layer film or sheet material is composed of three of more layers, the thickness of the intermediate layer should be in the range from 3 to 150 μm or, preferably, from 5 to 100 μm.

When the inventive multi-layer film or sheet material is used in the preparation of a laminated film with a low-density polyethylene and the like as the adhesive layer, lamination of the material is performed on the layer A of the multi-layer film or sheet material. When bags are prepared of the inventive multi-layer film or sheet material, heat-sealing is performed on the layers B so that the layer B faces the inside of the bag.

The inventive multi-layer film or sheet material is usually used as a covered container or receptacle shaped by thermal molding. In this case, good heat-sealing can be obtained with the film material of the covering when the layer A faces inside of the container. This is to meet the requirement of the easy peelability for the covering of the container.

The resins or resin compositions of which the layers A and B of the inventive multi-layer film or sheet material are formed may be formulated according to need with a variety of additives known in the art of plastics including various kinds of stabilizers, e.g. heat stabilizers, antioxidants and anti-weathering agents, ultraviolet absorbers, anti-static agents, anti-blocking agents, slipperiness improvers, anti-fogging agents, peroxide decomposers, basicity aids, nuclei-forming agents, plasticizers, lubricants, flame retardancy improvers, coloring agents, e.g. pigments and dyes, inorganic fillers, e.g. silica, talc and kaolin, and others. It is also optional that the resin or resin composition is admixed with other kinds of resins or thermoplastic elastomers provided no substantial adverse effects are caused thereby.

As is understood from the detailed description given above, the multi-layer film or sheet material of the invention has very high sealability in respects of the adhesive bondability, low-temperature sealability and strength of sealing. The material is also excellent in the workability and adhesive bonding strength between layers and is highly cold-resistant as is shown by the high impact strength at low temperatures. In the inventive multi-layer film or sheet material, in short, many of the defective points in the polypropylene-based resins have been successfully dissolved by retaining the excellent properties inherent to the polypropylene-based resins such as heat resistance, mechanical strength and rigidity.

Accordingly, the application of the inventive multi-layer film or sheet material is not limited to wrapping of various articles as a double-layered film but it can be used in the preparation of a continuous length film web composed of three or more layers with one or more layers of other resins by utilizing the adhesive bondability and sealability of the layer A. In addition, the inventive multi-layer film or sheet material has good adaptability to lamination with excellent adhesive bondability so that a laminated film or sheet can be prepared thereof with a low-density polyethylene and the like as the adhesive layer even by omitting the anchoring treatment. Therefore, the multi-layer film or sheet material of the invention has wide applicability in various fields including the applications as a wrapping film of foods and other articles, material for shaping of containers and covering thereof by thermal molding and films of sealing layer in heat-resistant base films and the like.

In the following, detailed descriptions are given of the second embodiment of the present invention.

The second embodiment of the invention provides a laminated film or sheet material comprising (1) a base material and (2) a multi-layer film or sheet material composed of the layers A and B described in the above in detail adhesively bonded together one on the other through (3) a layer 3 of an adhesive intervening between the base material and the multi-layer film or sheet material, in which the layer A of the multi-layer film or sheet material faces the base material.

The base material in the above mentioned laminated film or sheet material of the invention can be a film or sheet of a synthetic resin, paper, cellophane or aluminum foil. The synthetic resin is exemplified by high-density polyethylenes, medium- or low-density polyethylenes, ethylene α-olefin copolymer, ethylene unsaturated carboxylic acid copolymer, polypropylene, poly(butene-1), ionomers and the like polyolefin polymers, polyvinyl chloride, polyvinylidene chloride, polystyrene, polyacrylonitrile and the like vinylic polymers, nylon 6, nylon 66, nylon 11 and the like polyamide resins, polyethylene terephthalate, polybutylene terephthalate and the like polyester resins, polycarbonates, polyvinyl alcohols, ethylene vinyl alcohol copolymer, and others. Uniaxially or biaxially stretched films or sheets of these polymers can be used, if desired. The film or sheet can be coated with polyvinylidene chloride or may be a multi-layered one composed of two or more layers.

The above described base material is laminated with the multi-layer film or sheet material of the invention composed of the layers A and B described above by use of a layer 3 of an adhesive intervening therebetween in such a manner that the layer A of the multi-layer film or sheet material faces the base material.

The adhesive layer 3 used in this case is not particularly limitative but it should appropriately be selected according to the process for the preparation of the laminated, film or sheet material. For example, reactive adhesives such as polyester-type polyurethanes, polyether-type polyurethanes, epoxy-based ones and the like and ethylene-based polymers and others are suitable. The ethylene-based polymers here implied include low-density polyethylenes by the high pressure process, low-density ethylene α-olefin copolymer, so-called linear low-density polyethylenes, ethylene unsaturated carboxylic acid copolymer, ethylene-based ionomers and the like. The low-density polyethylene resins, which may widely range from a crystalline polyethylene resin to non-crystalline polyethylene resin, should have a density in the range from 0.860 to 0.940 g/cm$^3$ or, preferably, from 0.880 to 0.930 g/cm$^3$. These polyethylene-based resins as well as polypropylene-based resins may be admixed with a polyolefin resin modified with an unsaturated carboxylic acid or a derivative thereof such as maleic acid, maleic anhydride and the like. Further, it is optional that the adhesive is admixed with resins and rubbers of other types in such a limited amount that the performance as the adhesive layer in the invention is not substantially affected. The adhesive, layer can be formed of a mixture of two kinds or more of the adhesive resins or it can be of a layered structure formed of two kinds or more of different adhesives each forming a layer.

The laminated film or sheet material provided by the second embodiment of the present invention is prepared by laminating the above described base material and the multi-layer film or sheet material comprising the layers A and B by use of the adhesive layer 3 intervening therebetween in such a manner that the layer A of the multi-layer film or sheet material faces the base material.

Though dependent on the kind of the material, it is sometimes preferable that the lamination of the base material is preceded in advance by the coating treatment of the surface with an anchor-coating agent such as polyethyleneimine compounds, organic titanium compounds, isocyanate compounds and the like according to the known procedure with an object to increase the strength of adhesive bonding.

Figure 2:
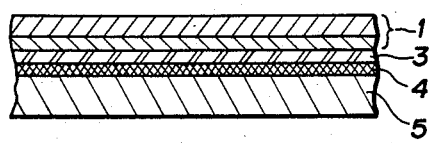

FIGS. 1 and 2 each illustrate a laminated film or sheet material of the invention obtained by the dry lamination method and the extrusion lamination or co-extrusion lamination method, respectively.

Figure 3:
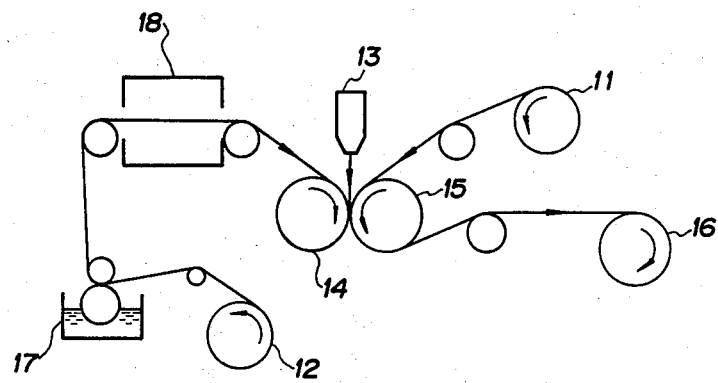
FIG. 3 is a schematic illustration of the manufacturing process of the laminated film or sheet material of the invention.

FIG. 3 schematically illustrates the process for the preparation of the laminated film or sheet material of the invention by the extrusion lamination method. The multi-layer film or sheet material and the base material are each drawn out of the draw-out roll 11 for the former and the draw-out roll 12 for the latter, respectively, and the adhesive resin is extruded out of the extrusion die 13 between these two film or sheet materials. Pressing in the press roll 14 and cooling in the cooling roll 15 give the laminated film or sheet material which is continuously taken up on the winding-up roll 16. When a low-density polyethylene is used as the adhesive resin, the temperature of the resin should be kept at 250° to 350° C. or, preferably, 280° to 330° C. under a linear pressure of the press roll in the range from 2 to 30 kg/cm or, preferably, from 3 to 20 kg/cm. One of the largest characteristic features in the present invention is, in comparison with the conventional use of a sealing layer of polypropylene, that the use of a specific multi-layer film or sheet material as the sealing layer ensures to obtain a laminated film or sheet material having sufficiently high adhesive bonding strength between layers without the anchoring treatment of the film for the sealing layer. In the figure, the numerals 17 and 18 designate the tank for the anchoring treatment and the drier, respectively.

As is described above in detail, the anchoring treatment can be omitted in the manufacture of the laminated film or sheet material of the invention by the extrusion lamination method as a result of the use of the specific multi-layer film or sheet material having excellent heat resistance, strength and transparency approximating those of the polypropylene-based resins so that the manufacturing process can be performed inexpensively without the problems of unpleasant ordor due to organic solvents and health and safety of the workers. Further, the laminated film or sheet material of the invention has excellent strength of lamination and heat-sealability along with the features in the heat resistance, strength, rigidity, etc. so that wide applicability can be expected of the material as a wrapping material, e.g. bags for wrapping, thermally molded containers and coverings of containers, of various kinds of articles such as foods and the like.

In the following, the present invention is described in more detail by way of examples although the present invention is not limited by these examples by all means provided that the scope of the invention is not affected.

EXAMPLE 1

Using a random-polymerized polypropylene containing 4% by weight of ethylene and having a density of 0.90 g/cm$^3$ and a melt index of 7 g/10 minutes for the layer B and a resin composition composed of 40 parts by weight of the same polypropylene as above and 60 parts by weight of an ethylene octene-1 copolymer having a density of 0.923 g/cm³ and a melt index of 4 g/10 minutes for the layer A, a double-layered film formed of the layers B and A was prepared by extruding the above described resin and resin composition with a 65 mm-diameter extruder at a resin temperature of 250° C. and a 50 mm-diameter extruder at a resin temperature of 240° C., respectively, and supplying to a multi-manifold double-layer T-die having a width of 800 mm and kept at a die temperature of 270°/250° C. to be extruded therefrom followed by cooling at a chill roll and winding up in a roll.

The thickness of the thus prepared double-layered film was 25 μm as formed of the polypropylene layer of 23 μm thick and the layer of the resin composition of 2 μm thick. Physical properties of this film are shown in Table 1 below.

This double-layered film was then laminated with a film of a low-density polyethylene by the high-pressure process having a thickness of 180 μm and a density of 0.92 g/cm³ on the layer A by melt-bonding at 150° C. under a pressure of 0.4 kg/cm². The adhesive bonding strength of this laminated film was 1800 g/15 mm. No peeling was noted in the double-layered film.

EXAMPLES 2 TO 4

The same random-polymerized polypropylene as used in Example 1 (referred to as I hereinbelow), a homopolymeric polypropylene having a density of 0.91 g/cm³ and a melt index of 10 g/10 minutes for the layer B (referred to as II hereinbelow) and a resin composition composed of the same random-polymerized polypropylene as above and an ethylene octene-1 copolymer in a proportion shown in Table 2 below, in which the polypropylene and the copolymer are shown by the symbols PP and LLDPE, respectively, for the layer A (referred to as III hereinbelow) were each supplied to and extruded by a 50 mm-diameter extruder at a resin temperature of 240° C., a 65 mm-diameter extruder at a resin temperature of 250° C. and a 50 mm-diameter extruder at a resin temperature of 240° C., respectively followed by cooling in a chill roll and winding-up in a roll to give a triple-layered film of 25 μm thick. The ratio of the thickness of the layers was I:II:III=2:12:1. The physical properties of these films are shown in Table 1 and the adhesive bonding strength of the films determined in the same manner as in Example 1 is shown in Table 2 for each of the films.

COMPARATIVE EXAMPLE 1

A triple-layered film was prepared in substantially the same manner as in Example 2 except that the layer (III), i.e. the layer A, was formed of the ethylene octene-1 copolymer alone. The adhesive bonding strength of the thus prepared film was 300 g/15 mm and peeling was found between the layers of the film.

COMPARATIVE EXAMPLE 2

A triple-layered film was prepared in substantially the same manner as in Example 2 except that the layer (III), i.e. the layer A, was formed of a resin composition composed of 40 parts by weight of a random-polymerized polypropylene and 60 parts by weight of a low-density polyethylene by the high-pressure process having a density of 0.934 g/cm³ and a melt index of 3 g/10 minutes. The thus prepared film had an adhesive bonding strength of only 180 g/15 mm and peeling was found between the layers of the film.

EXAMPLE 5

A resin composition A composed of 40 parts by weight of a random polypropylene containing 4% by weight of ethylene and having a density of 0.90 g/cm³ and a melt index of 7 g/10 minutes and 60 parts by weight of an ethylene octene-1 copolymer containing 8% by weight of octene-1 and having a density of 0.923 g/cm³ and a melt index of 4 g/10 minutes and a resin composition B composed of 85 parts by weight of the same random polypropylene as above and 15 parts by weight of a low-crystallinity ethylene-propylene copolymer (EPR) containing 23% by weight of propylene and having a density of 0.86 g/cm³, a melt index of 3.6 g/10 minutes, a degree of crystallization of 17% and a Mooney viscosity of $ML_{1+4}$ (100° C.) 20 were each melted and kneaded by use of a 50 mm-diameter extruder at a resin temperature of 240° C. and a 65 mm-diameter extruder at a resin temperature of 250° C., respectively and supplied to a multi-manifold double-layer T-die having a die width of 800 mm and kept at 250° C. to be extruded therefrom followed by cooling in a chill roll and winding up in a roll to give a double-layered film composed of the layer A formed of the above described resin composition A and the layer B formed of the above described resin composition B. The thickness of this double-layered film was 25 μm and the thickness ratio of the layer A to the layer B was 1:5. The physical properties of this film are shown in Table 1.

The double-layered film thus prepared was then laminated by melt-bonding on the layer A with a 180 μm thick film of a low-density polyethylene by the high-pressure process having a density of 0.92 g/cm³ at 150° C. under a pressure of 0.4 kg/cm². The adhesive bonding strength in this laminated film was 1800 g/15 mm and no peeling was found between the layers of the film. The sealing temperature between two layers B was 124° C. The sealing temperature here implied is such a temperature that the peeling resistance between two films bonded together at the temperature by pressing for 1 second under a pressure of 2 kg/cm² is 300 g/25 mm.

COMPARATIVE EXAMPLE 3

A multi-layered film was prepared in substantially the same manner as in Example 5 except that the resin composition B was replaced with another resin composition composed of 85 parts by weight of the same random polypropylene as used in Example 5 and 15 parts by weight of a low-density polyethylene having a density of 0.930 g/cm³ and a melt index of 3 g/10 minutes. The sealing temperature between the layers formed of the above described resin composition in place of the resin composition B was 138° C. to be apparently higher than in Example 5. Further, the transparency of the thus obtained film was very low due to the poor miscibility of the component resins.

EXAMPLE 6

A multi-layered film was prepared in substantially the same manner as in Example 5 except that the resin composition B used in Example 5 was replaced with another resin composition composed of 85 parts by weight of the same random polypropylene as used in Example 5 and 15 parts by weight of a low-crystallinity ethylene butene-1 copolymer having a density of 0.88 g/cm³, a melt index of 3 g/10 minutes and a degree of crystallinity of 24%. The physical properties of this multi-layered film are shown in Table 1. The sealing temperature of this film was 125° C.

EXAMPLES 7 TO 9

In Example 7, a triple-layered film was prepared by extruding a homopolymeric polypropylene having a density of 0.91 g/cm³ and a melt index of 10 g/10 minutes at a resin temperature of 240° C. as an intermediate layer between the same layers A and B as in Example 5. The thus obtained triple-layered film was 25 μm and the thickness ratio of the layer A:intermediate layer:layer B was 1:5:1. The physical properties of this triple-layered film are shown in Table 1. The sealing temperature between two layers B of the thus obtained triple-layered film was 124° C.

Further, triple-layered films were prepared in Examples 8 and 9 each by use of a resin composition composed of 92% by weight of the random polypropylene and 8% by weight of the ethylene-propylene copolymer (EPR) or 94% by weight of the random polypropylene and 6% by weight of the EPR, respectively, for the layer B. The physical properties of these triple-layered films are also shown in Table 1. The sealing temperatures of these films between the layers B were 129° C. and 133° C. for the films prepared in Examples 8 and 9, respectively.

EXAMPLE 10

A biaxially stretched polypropylene film having a thickness of 30 μm was drawn out of a rool as a base material and coated on one surface with a polyethyleneimine-type anchor coating agent in a coating amount of 2.0 to 2.5 g/m² as solid followed by drying. On the other hand, the double-layered film prepared in Example 1 was drawn out of another roll to run in parallel with the above mentioned base material with the layer A formed of the resin composition facing the base material. Between these two films, a low-density polyethylene by the high-pressure process having a density of 0.920 g/cm³ and a melt index of 7 g/10 minutes was extruded at a resin temperature of 300° C. as the layer C having a thickness of 15 μm under the extrusion conditions of an air gap of 80 mm and a die width of 500 mm and the base material and the double-layered film were laminated under a linear roll pressure of about 4 kg/cm sandwiching the layer C to give a laminated film of a thickness 70 μm.

The lamination strength of the thus prepared laminated film was more than 1000 g/15 mm exhibiting material bursting and no peeling between layers was found.

EXAMPLE 11

A laminated film having a thickness of 70 μm was prepared in substantially the same manner as in Example 10 except that the double-layered film used in Example 10 was replaced with the triple-layered film obtained in Example 2.

The lamination strength of the thus prepared laminated film was more than 1000 g/15 mm exhibiting material bursting and no peeling was found between the layers thereof. Further, the laminated film was subjected to the heat sealing test between the triple-layered films under a sealing pressure of 0.4 kg/cm² at varied temperatures of 140° to 170° C. The heat-sealing strength in this case was as follows for each of the heat-sealing temperatures.

| | |
|---|---|
| 140° C. | 1600 g/15 mm |
| 150° C. | 2000 g/15 mm |
| 160° C. | 2300 g/15 mm |
| 170° C. | 2500 g/15 mm |

COMPARATIVE EXAMPLE 4

A laminated film was prepared in substantially the same manner as in Example 10 escept that the double-layered film used in Example 10 was replaced with a single nonstretched film of a random polypropylene having a thickness of 25 μm. The lamination strength of the thus prepared laminated film was 240 g/15 mm and the heat-sealing strength was 1300 g/15 when the heat-sealing temperature was 160° C.

TABLE 1

| Example No. | Tensile*¹ strength kg/cm² MD/TD | Tensile*¹ modulus kg/cm² MD/TD | Ultimate*¹ elongation % MD/TD | Tear*² strength kg/cm MD/TD | Impact*³ strength kg · cm/cm | Haze*⁴ % |
|---|---|---|---|---|---|---|
| 1 | 580/380 | 7770/7810 | 420/600 | 7/169 | 2800 | 4.5 |
| 2 | 650/400 | 9500/9500 | 450/600 | 7/250 | 1800 | 5.0 |
| 3 | 660/420 | 10000/10000 | 450/600 | 7/220 | 2000 | 4.8 |
| 4 | 665/450 | 11500/11500 | 450/600 | 6/200 | 2220 | 4.6 |
| 5 | 570/300 | 8300/8000 | 450/600 | 15/290 | 2800 | 6.0 |
| 6 | 575/310 | 8200/8000 | 460/580 | 16/280 | 2700 | 5.9 |
| 7 | 650/400 | 9500/9500 | 450/600 | 7/250 | 1800 | 5.2 |
| 8 | 660/420 | 9800/9800 | 470/610 | 6/240 | 1800 | 5.0 |
| 9 | 665/450 | 10200/10000 | 480/650 | 6/220 | 1750 | 4.8 |

*¹Tensile properties were determined according to JIS Z 1702.
*²Tear strength was determined according to JIS Z 1702.
*³Impact strength was determined by the film-impact method in which the film was held by a ring-like frame and hit and broken through by a pendulum having a 1-inch impact head to record the energy required therefor.
*⁴Haze was determined according to ASTM D1003.

TABLE 2

| Example No. | Formulation for the layer A, % by weight | | Adhesive bonding strength of the laminated film (g/15 mm) |
|---|---|---|---|
| | PP | LLDPE | |
| 2 | 40 | 60 | 1800 |
| 3 | 50 | 50 | 1000 |
| 4 | 60 | 40 | 400 |

What is claimed is:
1. A multi-layer film or sheet material which comprises:
   (A) a layer formed of a resin composition consisting essentially from 5 to 80 parts by weight of the polypropylene-based resin and from 95 to 20 parts by weight of the linear low-density ethylene α-olefin copolymer having a density in the range from 0.900 to 0.950 g/cm3; and (B) a layer formed of a resin composition consisting essentially from 50 to 99 parts by weight of the polypropylene-based resin and from 50 to 1 part by weight of the low-crystallinity α-oelfin copolymer having a density of from 0.860 to 0.890 g/cm$^3$.

2. A laminated film or sheet material which comprises:
(1) a base material; and
(2) a multi-layer film or sheet material comprising
 (A) a layer formed of a resin composition consisting essentially of from 5–80 parts by weight of a polypropylene-based resin and from 95–20 parts by weight of a linear low-density ethylene α-olefin copolymer having a density in the range from 0.900 to 0.950 g/cm$^3$ and
 (B) a layer formed of a polypropylene-based resin or a layer formed of a resin composition consisting essentially of from 50–99 parts by weight of a polypropylene-based resin and from 50–1 parts by weight of a low-crystallinity α-olefin copolymer having a density of from 0.860 to 0.890 g/cm$^3$; and
(3) a layer of an adhesive positioned between and bonded to (i) the base material (1) and (ii) the layer (A) of said multi-layer film or sheet material (2).

3. The laminated film or sheet material as claimed in claim 2 wherein the layer (A) of the multi-layer film or sheet material is formed of a resin composition consisting essentially of from 5 to 80 parts by weight of the polypropylene-based resin and from 95 to 20 parts by weight of the linear low-density ethylene α-olefin copolymer having a density in the range from 0.900 to 0.950 g/cm$^3$.

4. The laminated film or sheet material as claimed in claim 2 wherein the layer (B) of the multi-layer film or sheet material is formed of a resin composition consisting essentially of from 50 to 99 parts by weight of the polypropylene-based resin and from 50 to 1 part by weight of the low-crystallinity α-olefin copolymer.

5. The laminated film or sheet material as claimed in claim 2 wherein the layer (3) is formed of an adhesive consisting essentially of an ethylene-based polymer having a density in the range from 0.860 to 0.940 g/cm$^3$.

6. The laminated film or sheet material as claimed in claim 1 wherein the polypropylene-based resin in the layer (A) has a density of from 0.895 to 0.915 g/cm$^3$ and a melt index from 0.5 to 30 g/10 minutes.

7. The laminated film or sheet material as claimed in claim 1 wherein the linear low-density ethylene α-olefin copolymer of the layer (A) has a density of from 0.900 to 0.930 g/cm$^3$ and a melt index of from 0.5 to 30 g/10 minutes.

8. The multi-layer film or sheet material as claimed in claim 1 wherein said layer (A) is formed of a resin composition consisting essentially of from 10 to 60 parts by weight of the polypropylene-based resin and from 90 to 40 parts by weight of the linear low-density ethylene α-olefin copolymer.

9. The multi-layer film or sheet material as claimed in claim 1 wherein the low-crystallinity α-olefin copolymer of the layer (B) has a melt index of from 0.01 to 50 g/10 minutes and a degree of crystallinity up to 30%.

10. The multi-layer film or sheet material as claimed in claim 1 wherein the layer (B) is formed of a resin composition consisting essentially of from 70 to 90 parts by weight of the polypropylene-based resin and from 30 to 5 parts by weight of the low-crystallinity α-olefin copolymer.

11. The multi-layer film or sheet material as claimed in claim 5 wherein the layer (B) is formed of a resin composition consisting essentially of from 70 to 90 parts by weight of the polypropylene-based resin and from 30 to 5 parts by weight of the low-crystallinity α-olefin copolymer.

12. The multi-layer film or sheet material as claimed in claim 11 wherein the polypropylene-based resin in the layer (A) has a density of from 0.895 to 0.915 g/cm$^3$ and a melt index from 1.0 to 20 g/10 minutes; said linear low-density ethylene α-olefin copolymer has a density from 0.900 to 0.930 g/cm$^3$ and a melt index of from 1.0 to 20 g/10 minutes; and wherein said low-crystallinity α-olefin copolymer of the layer (B) has a melt index of from 0.05 to 20 g/10 minutes and a degree of crystallinity up to 25%.

13. The multi-layer film or sheet material as claimed in claim 12 wherein said layer (A) has a thickness of from 1 to 20 μm and the thickness of the layer (B) is from 1 to 50 μm.

14. The laminated film or sheet material as claimed in claim 2 wherein the polypropylene-based resin in the layer (A) has a density of from 0.895 to 0.915 g/cm$^3$ and a melt index from 0.5 to 30 g/10 minutes.

15. The laminated film or sheet material as claimed in claim 2 wherein the linear low-density ethylene α-olefin copolymer of the layer (A) has a density of from 0.900 to 0.930 g/cm$^3$ and a melt index of from 0.5 to 30 g/10 minutes.

16. The laminated film or sheet material as claimed in claim 2 wherein said layer (A) is formed of a resin composition consisting essentially of from 10 to 60 parts by weight of the polypropylene-based resin and from 90 to 40 parts by weight of the linear low-density ethylene α-olefin copolymer.

17. The laminated film or sheet material as claimed in claim 2 wherein the low-crystallinity α-olefin polymer of the layer (B) has a melt index of from 0.01 to 50 g/10 minutes and a degree of crystallinity up to 30%.

18. The laminated film or sheet material as claimed in claim 2 wherein the layer (B) is formed of a resin composition consisting essentially of from 70 to 90 parts by weight of the polypropylene-based resin and from 30 to 5 parts by weight of the low-crystallinity α-olefin copolymer.

19. The laminated film or sheet material as claimed in claim 16 wherein the layer (B) is formed of a resin composition consisting essentially of from 70 to 90 parts by weight of the polypropylene-based resin and from 30 to 5 parts by weight of the low-crystallinity α-olefin copolymer.

20. The laminated film or sheet material as claimed in claim 19 wherein the polypropylene-based resin in the layer (A) has a density of from 0.895 to 0.915 g/cm$^3$ and a melt index from 1.0 to 20 g/10 minutes; said linear low-density ethylene α-olefin copolymer has a density from 0.900 to 0.930 g/cm$^3$ and a melt index of from 1.0 to 20 g/10 minutes; and wherein said low-crystallinity α-olefin copolymer of the layer (B) has a melt index of from 0.05 to 20 g/10 minutes and a degree of crystallinity up to 25%.

21. The laminated film or sheet material as claimed in claim 20 wherein said layer (A) has a thickness of from 1 to 20 μm and the thickness of the layer (B) is from 1 to 50 μm.

* * * * *

UNITED STATES PATENT AND TRADEMARK OFFICE
CERTIFICATE OF CORRECTION

PATENT NO. : 4,623,587

DATED : November 18, 1986

INVENTOR(S) : ITO et al

It is certified that error appears in the above-identified patent and that said Letters Patent is hereby corrected as shown below:

Column 12 (Claim 1), line 67, after "consisting essentially", insert --of--.

Column 13 (Claim 1), line 5, after "consisting essentially", insert --of--.

Column 14 (Claim 11), line 4, change "claim 5" to

--claim 8--.

Signed and Sealed this

Twelfth Day of January, 1993

Attest:

DOUGLAS B. COMER

*Attesting Officer*　　　Acting Commissioner of Patents and Trademarks